2,729,636
Patented Jan. 3, 1956

2,729,636

N,N-DIALKYLTHIAMORPHOLINIUM CHLORIDES, THEIR MONOXIDES AND DIOXIDES

John G. Erickson, Minneapolis, Minn., assignor to General Mills, Inc., a corporation of Delaware No Drawing. Application August 3, 1953,
Serial No. 372,142

4 Claims. (Cl. 260—243)

The present invention relates to N,N-dialkylthiamorpholinium chlorides and to their monoxides and dioxides. It also relates to a method of preparing these compounds. These compounds are relatively inexpensive compounds which have utility as detergents, wetting agents, bactericides and as reactants for the formation of complexes with bentonite for the preparation of improved greases.

It is, therefore, an object of the present invention to provide novel compounds having the above formula.

It is another object of the present invention to provide a novel process of producing these compounds.

The compounds have the following formula:

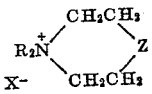

where Z is >S, >SO or >SO₂, R is a long chain aliphatic hydrocarbon group containing from 8–22 carbon atoms, and X is chlorine or bromine. These compounds may be made by the following reaction:

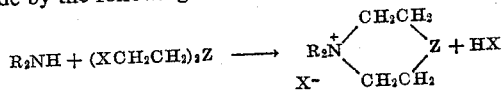

The secondary fatty amines which are employed contain from 8–22 carbon atoms. They may be prepared from fatty acids through the intermediate of the nitrile. The fatty acids employed may be single isolated fatty acids or may be the mixed acids of a fat or oil or any selected fraction thereof. Accordingly, the products obtained may be mixed amines and may be saturated or unsaturated.

In carrying out the reaction it is preferred to employ a substantial excess of the amine as an accepter of hydrogen halide which is shown above to be liberated in the reaction. If this hydrogen halide is not neutralized, the reaction tends to stop with the formation of the tertiary amine hydrohalide. The best way to neutralize the hydrogen halide is to use at least 100% excess of secondary amine. This permits the reaction to go on to the cyclic quaternary ammonium compound while the secondary amine hydrohalide is formed as a by-product. In place of using the excess of the amine as a hydrogen halide accepter one may use calcium carbonate, sodium carbonate, or similar alkaline reacting materials to neutralize the HX, but these materials are less desirable.

The reaction takes place at temperatures as low as 65–70° C. but the rate is increased by higher temperatures. Temperatures up to 150° C. may be employed without excessive decomposition taking place. Temperatures of around 130° C. are desirable, and at this temperature from 10–20 hours is usually sufficient for the reaction to be completed.

It is desirable to employ an inert solvent in the reaction. If one heats the secondary fatty amine in mustard gas or the sulfoxide or sulfone, the mixture becomes solid. If small amounts of an inert solvent are added, however, the mixture will remain fluid. Suitable solvents include alcohols, glycols, ethers and hydrocarbons. A wide variety of these materials may be used as solvents, and it is only necessary that they be free from functional groups which would react with one or the other of the reagents. Higher and lower aliphatic alcohols may be used, and the method of removal of the alcohol will depend upon its physical characteristics, i. e. whether soluble in water or in other organic solvents. Where excess amine is used as the hydrogen halide accepter, the reaction mixture may be worked up by dissolving it in hot methanol, adding sufficient alkali metal hydroxide to liberate the amine, cooling, filtering off the amine and evaporating the filtrate to recover the desired product.

Example 1

A mixture of 53 parts of didodecylamine, 10.6 parts of mustard gas (90% pure) and 15 parts of n-butyl alcohol was heated at 125–150° C. for 27 hours. It was dissolved in 240 parts of methanol and a solution of 2.5 parts of sodium hydroxide in water was added. The mixture was chilled and filtered. The filtrate was evaporated to dryness. The residue was recrystallized twice from ethyl acetate, giving N,N-didodecylthiamorpholinium chloride as iridescent white flakes, melting with decomposition at 160–200° C.

Example 2

A mixture of 349.7 parts of didoctadecylamine, 48.2 parts of mustard gas (90% pure) and 20 parts of n-butyl alcohol was heated at 125–140° C. for 24 hours. It was poured into 1600 parts of methanol and an aqueous solution of 12 parts of sodium hydroxide was added. The mixture was thoroughly stirred and heated to boiling, then cooled and filtered. The filtrate was evaporated to dryness. Recrystallization of the residue from ethyl acetate gave N,N-dioctadecylthiamorpholinium chloride as a white solid, melting with decomposition at 202–204.5° C. A solution of 0.64 part of N,N-dioctadecylthiamorpholinium chloride in ethanol was added to 100 parts of 1% aqueous bentonite suspension. A precipitate formed, was filtered off, washed with water, dried and crushed in a mortar. When stirred with benzene, it gelled the hydrocarbon rapidly.

Example 3

A mixture of 62.5 parts of dioctadecylamine, 9.5 parts of 2-chloroethyl sulfone and 16 parts of n-butyl alcohol was heated at 130° for 14 hours, then mixed with 800 parts of hot methanol and neutralized with a water-methanol solution of 2 parts of sodium hydroxide. The mixture was cooled, filtered and evaporated to dryness under reduced pressure. The residue was recrystallized from ethyl acetate containing a little methanol. This gave the 1,1-dioxide of N,N-dioctadecylthiamorpholinium chloride. It is a white solid, melting at 197–199° C. A solution of 3.4 parts of the 1,1-dioxide of N,N-dioctadecylthiamorpholinium chloride in isopropyl alcohol was added to 500 parts of 1% aqueous bentonite suspension. A precipitate formed, was filtered off, washed with water, dried and crushed in a mortar. When mixed with heavy mineral oil and passed through a three-roll paint mill, it formed a very stiff grease. The grease containing 10% of said dried precipitate had a stiffness of 850 on an arbitrary scale, whereas a grease containing 10% of a commercially available quaternary ammonium-bentonite complex (Bentone 34) had a stiffness of 350 on this same scale.

When mixed with benzene, the above precipitate gelled the benzene.

In place of using the 2-chloroethyl sulfone or sulfoxide it is possible to prepare the thiamorpholinium compound and convert this compound to the sulfoxide or the sulfone by oxidizing with hydrogen peroxide, or other suitable oxidizing agents.

I claim as my invention:

1. Process of preparing compounds having the following formula:

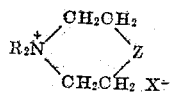

in which R is a saturated aliphatic hydrocarbon group containing from 8–22 carbon atoms and X is selected from the group consisting of chlorine and bromine and Z is selected from the group consisting of $=S$, $=SO$, and $=SO_2$ which comprises reacting the secondary amine $R_2NH$ with the compound $(ClCH_2CH_2)_2Z$ at a temperature within the approximate range of 65–150° C. in the presence of an alkaline material.

2. Process according to claim 1 in which the secondary amine is employed in excess to accept hydrogen chloride liberated in the reaction.

3. Process according to claim 1 in which the reaction is carried out at approximately 125–150° C.

4. Process according to claim 1 in which the reaction is carried out in the presence of an inert organic solvent.

References Cited in the file of this patent

UNITED STATES PATENTS

| | | |
|---|---|---|
| 2,439,749 | Niederl et al. | Apr. 13, 1948 |
| 2,541,714 | Niederl et al. | Feb. 13, 1951 |
| 2,569,326 | Niederl et al. | Sept. 25, 1951 |

OTHER REFERENCES

Hart et al.: "Jour. Am. Chem. Soc." (1946), vol. 68, pp. 714–5.

Hart et al.: "Jour Am. Chem. Soc." (1944), vol. 66, p. 1610.